US008292395B2

(12) United States Patent
Ben-Zur et al.

(10) Patent No.: US 8,292,395 B2
(45) Date of Patent: Oct. 23, 2012

(54) MATRIX PRINTING DEVICE

(75) Inventors: Ofer Ben-Zur, RaAnana (IL); Asaf Kaplan, Moshav Ein-Sarid (IL); Jacob Mozel, Kfar-Saba (IL)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 154 days.

(21) Appl. No.: 12/853,369

(22) Filed: Aug. 10, 2010

(65) Prior Publication Data

US 2011/0032300 A1 Feb. 10, 2011

Related U.S. Application Data

(60) Provisional application No. 61/245,333, filed on Sep. 24, 2009, provisional application No. 61/272,436, filed on Sep. 24, 2009, provisional application No. 61/232,494, filed on Aug. 10, 2009.

(51) Int. Cl.
B41J 29/38 (2006.01)
(52) U.S. Cl. .......................................................... 347/16
(58) Field of Classification Search .................... 347/15, 347/16, 101, 102, 104
See application file for complete search history.

(56) References Cited

U.S. PATENT DOCUMENTS

| 2,123,638 | A | 7/1938 | Steccone |
| 3,100,704 | A | 8/1963 | Coles et al. |
| 3,990,363 | A | 11/1976 | Vertegaal |
| 4,284,758 | A | 8/1981 | North |
| 4,285,690 | A | 8/1981 | North |
| 4,345,063 | A | 8/1982 | North |
| 4,888,093 | A | 12/1989 | Dean et al. |
| 5,348,997 | A | 9/1994 | Kato et al. |
| 5,360,933 | A | 11/1994 | Imashiro et al. |
| 5,432,229 | A | 7/1995 | Aoki et al. |
| 5,596,047 | A | 1/1997 | Wu et al. |
| 6,063,922 | A | 5/2000 | Flood et al. |
| 6,124,398 | A | 9/2000 | Imashiro et al. |
| 7,119,160 | B2 | 10/2006 | Kodama et al. |
| 7,134,749 | B2 | 11/2006 | Ben-Zur et al. |
| 7,381,347 | B2 | 6/2008 | Jacobs, III et al. |
| 7,425,062 | B2 | 9/2008 | Bauer |
| 7,723,400 | B2 | 5/2010 | Kobayashi et al. |
| 7,748,838 | B2 | 7/2010 | Oishi |
| 2005/0179708 | A1 | 8/2005 | Ben-Zur |
| 2006/0249039 | A1 | 11/2006 | Feldman et al. |
| 2007/0103528 | A1 | 5/2007 | Pearl et al. |

(Continued)

FOREIGN PATENT DOCUMENTS

EP 0121083 10/1984

(Continued)

OTHER PUBLICATIONS

International Search Report and the Written Opinion Dated Dec. 21, 2010 From the International Searching Authority Re. Application No. PCT/IL2010/000645.

(Continued)

*Primary Examiner* — An Do

(57) ABSTRACT

A textile printing machine includes a plurality of printing modules arranged in an m×n matrix, the matrix having m first rails in a transverse direction for supporting printing functional units such as print heads, and n second rails in a longitudinal direction for supporting printing trays that carry textiles to be printed, each module defining a meeting point for a textile printing related operation to take place. The matrix size is at least two by two and provides flexible linear printing sequences that are able to share resources such as print heads.

10 Claims, 6 Drawing Sheets

U.S. PATENT DOCUMENTS

| | | | |
|---|---|---|---|
| 2007/0103529 A1 | 5/2007 | Pearl et al. |
| 2007/0104899 A1 | 5/2007 | Pearl et al. |
| 2007/0148128 A1 | 6/2007 | Kennedy et al. |
| 2007/0218222 A1 | 9/2007 | Campbell et al. |
| 2007/0229577 A1 | 10/2007 | Morimoto |
| 2008/0006176 A1 | 1/2008 | Houjou |
| 2008/0012884 A1 | 1/2008 | Ben-Zur et al. |
| 2008/0241436 A1 | 10/2008 | Kobayashi |
| 2008/0268156 A1 | 10/2008 | Ueno et al. |
| 2009/0122127 A1 | 5/2009 | Baker |
| 2010/0075045 A1 | 3/2010 | Kaimoto et al. |

FOREIGN PATENT DOCUMENTS

| | | |
|---|---|---|
| EP | 0277361 | 8/1988 |
| EP | 2166046 | 3/2010 |
| IL | 162231 | 5/2007 |
| JP | 59-187029 | 10/1984 |
| WO | WO 2005/115089 | 12/2005 |

OTHER PUBLICATIONS

Kessel et al. "The Diacetone Acrylamide Crosslinking Reaction and Its Influence on the Film Formation of an Acrylic Latex", Journal of Coatings Technology and Research, 5(3): 285-297, Sep. 2008.

Official Action Dated May 14, 2012 From the US Patent and Trademark Office Re. U.S. Appl. No. 12/853,361.

International Preliminary Report on Patentability Dated Feb. 23, 2012 From the International Bureau of WIPO Re. Application No. PCT/IL2010/000645.

Restriction Official Action Dated Apr. 3, 2012 From the US Patent and Trademark Office Re. U.S. Appl. No. 12/853,361.

Fig 1
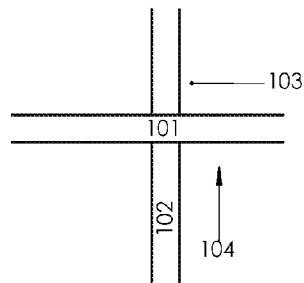
Fig 1a-100
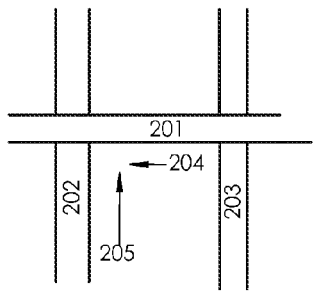
Fig 1b-200
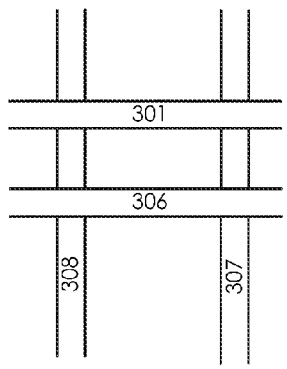
Fig 1c-300
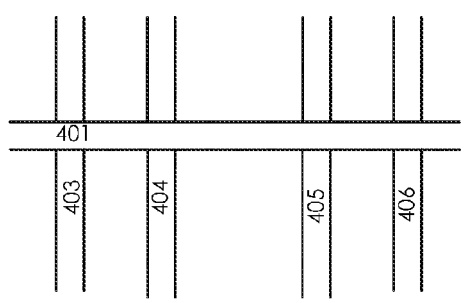
Fig 1d-400
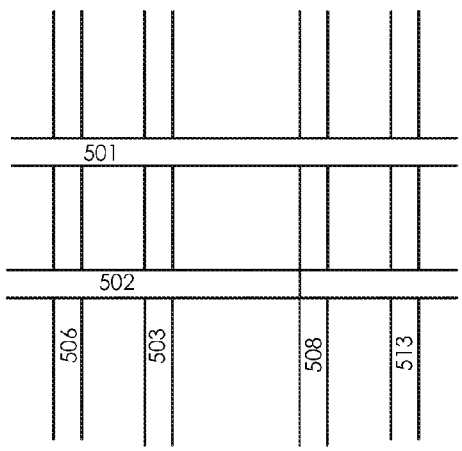
Fig 1e-500

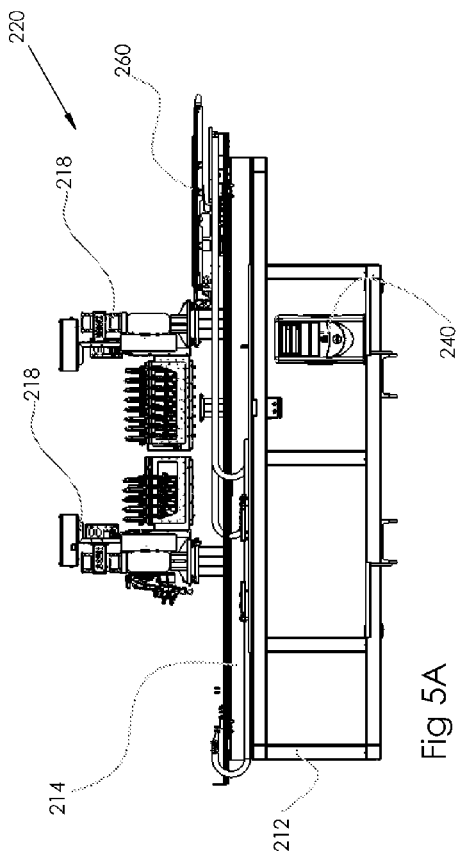
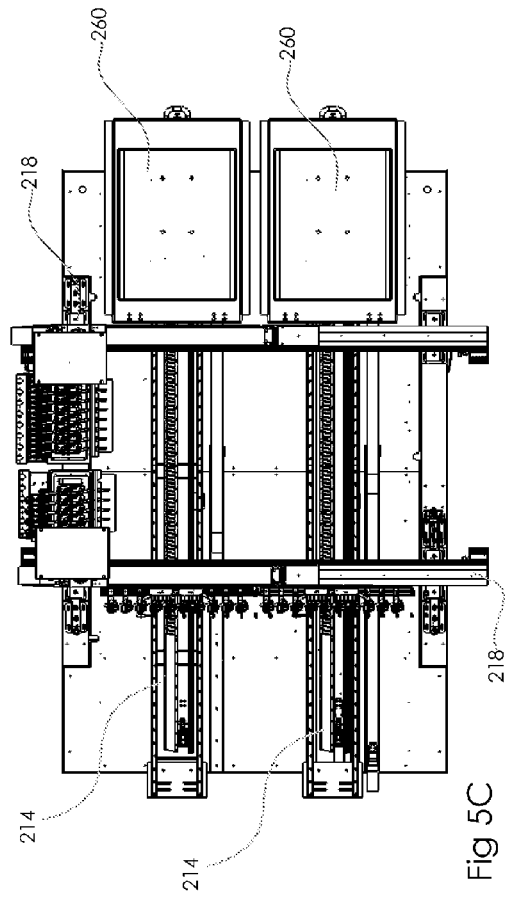
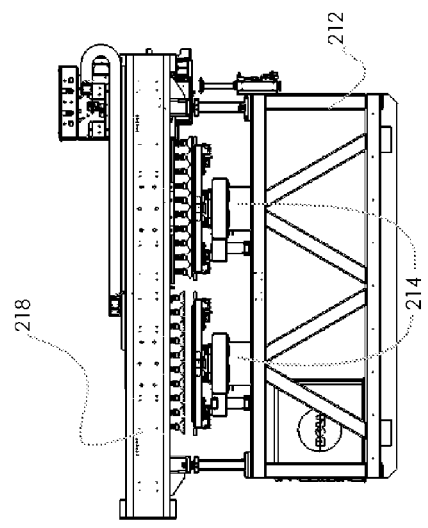
Fig 5A
Fig 5C
Fig 5B

MATRIX PRINTING DEVICE

RELATED APPLICATIONS

This application claims the benefit of priority under 35 USC 119(e) of U.S. Provisional Patent Application Nos. 61/272,436 and 61/245,333, both filed on Sep. 24, 2009, and of 61/232,494 filed on Aug. 10, 2009. The contents of the above applications are hereby incorporated by reference as if fully set forth herein.

FIELD AND BACKGROUND OF THE INVENTION

The present invention relates to a device for printing and, more particularly, but not exclusively to a high-speed printing machine for printing directly onto textiles including the application of print directly onto garments, built in a two dimensional matrix structure.

Screen printing and digital printing are both known methods in the art of garment printing. Mass production of garment decoration is performed today by screen printing press machines as described above, that are complex, inflexible, and require a specific set-up for each different print and color. First, an image file undergoes a mechanical spot-color separation process in which each color is printed in black and white on a separate sheet of paper or film. Then, the image is developed in a long optical process, into a fine mesh or screen, which is pressed during the printing process against the media. Before printing, each screen has to be set in the proper station and adjusted with reference to the other screens. Ink is transferred to the garment through the mesh by mechanical means, generally wiping a squeegee along the screen. Garment screen-printing technology requires a special press station for each color level.

Print quality is limited due to the high registration requirements between stations; hence printing resolution is relatively low. Thus, conventional screen-printing technology is not cost effective for short run processes, especially for sample printing stages.

In a simple screen printing operation the garment or cloth substrate placed on tray is first printed with one color, then moved to a next screen and printed with a second color, etc. To achieve high speed and high efficiency, a modern screen-printing machine has several stations, each station prints one color, and the printed substrates are moved in a sequence from station to station.

Digital printing employs a printing head having several ink injectors, each injector applying one color, so that a single printing head prints all the colors in a single operation. A controller moves the functional unit over the garment (or the garment may move under the functional unit) and instructs the ink injectors when to inject ink. To speed up the printing process, a digital printing system may employ several printing heads concurrently, and a printing head may have hundreds of injectors of the same color.

In screen printing, the fabrication of the screens and the setup of the printing machine, e.g. the mounting of the screens, is relatively slow and expensive. However, the printing itself is fast and inexpensive. Screen printing is therefore suitable for large product quantities. Screen printing can easily employ special colors and special effects such as glitter particles.

Digital printing creates images of higher spatial resolution (i.e. smaller pixel size) and higher color resolution (i.e. many more shades) of each color. The result is an image of much higher quality. Digital printing requires very short preparation prior to printing, however the printing itself is slow and inefficient relative to screen printing.

Printing processes often involve several stages. With textiles in particular, a pre-printing process such as a wetting process may be required; a post printing process such as ironing may be also required.

US patent application No 2005/0179708 A1 by Ofer Ben Zur, Published on Aug. 18, 2005 herein incorporated by reference discloses a digital printer having one digital printing head and two printing tables to allow loading and unloading of a garment as the other garment is printed. Thus down-time of the print head while the printing table is prepared is reduced or eliminated.

U.S. patent application Ser. No. 11/123,201 filled on 6 May 2005 by Feldman Alon et al, herein incorporated by reference, discloses a carousel printer for combining stencil and digital printing. The carousel allows for screen printing stations and digital printing stations together.

Digital garment printers, like the Brother GT541, that print directly on the garment are commonly used for short batches only.

However the fixed size of the carousel allows only for serial operation and requires a complete redesign for addition of stations to suit particular operations.

SUMMARY OF THE INVENTION

The present embodiments may provide an improved speed digital printing machine permitting accurate, high resolution printing on a substrate with relatively high efficiency, for decoration of garments and other rigid or flexible substrates.

The present embodiments may provide a printing matrix of modules arranged together. The matrix may thus combine required numbers of trays and printing stages on rails to allow flexible configurations for different printing operations.

A variation creates the matrix from printing modules in series and in parallel.

In such matrix structure, garments etc. to be printed may pass through each printing or accessory process in parallel, hence actual printing time is reduced.

Printing heads and other accessory process devices, hereinafter functional units, are provided as needed to each garment being printed on the matrix in a flexible manner.

According to one embodiment, the frame and matrix are made up of modular units assembled to build a customized configuration of the matrix in different matrix sizes such as 1×1, 6×4.

According to one aspect of the present invention there is provided a textile printing machine comprising a plurality of printing modules arranged in an m×n matrix, the matrix having a longitudinal direction and a transverse direction, the matrix having m first rails in said transverse direction for supporting printing functional units, and n second rails in said longitudinal direction for supporting printing trays that carry textiles to be printed, each module defining a meeting point between one of said first rails and one of said second rails for a textile printing related operation to take place, and wherein both m and n are integers of at least two, the matrix thereby providing linear printing sequences.

In an embodiment, said matrix is held together by a frame.

In an embodiment, said printing related operations comprise at least two of digital printing, screen printing, pre-printing and post-printing operations.

An embodiment may comprise a programmable controller, wherein each of said n transverse rails carries textiles for undergoing parallel printing sequences, and wherein said programmable controller comprises a process timer for ensuring that textiles on different ones of said transverse rails arrive at given stages of said parallel sequences at different times.

Embodiments may comprise a programmable controller, wherein each of said n transverse rails carries textiles for undergoing different printing sequences, and wherein said programmable controller comprises a process timer for ensuring that textiles on different ones of said transverse rails require the same functional units at different times.

In an embodiment at least one of m and n is at least three, or at least four or at least five or at least six.

In an embodiment, said textile printing trays are respectively independently controllable.

In an embodiment, one of said printing functional units is a digital printing head, wherein said inkjet nozzles further comprise drop-on-demand piezoelectric inkjet nozzles or continuous piezoelectric inkjet nozzles.

In an embodiment, one of said printing functional units comprises one member of the group consisting of an array of sprayers, a curing unit for curing ink on said item to be printed, an infrared curing unit, a hot air blowing curing unit, a microwave curing unit, an ironing unit for ironing said item to be printed, a stencil printing unit, an array of valve jet nozzles for performing digital printing, and a heat press.

According to a second aspect of the present invention there is provided a method for building a matrix for textile printing; comprising:

a. providing m first rails for bearing respective printing functional units and n second rails for bearing respective printing trays for holding a textile to be printed; and b. Placing said first rail substantially perpendicularly to each of said second rails to form an m×n printing matrix therefrom, both m and n being integers greater than 1.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the printing equipment and printing operations.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a-1e which are simplified schematic diagrams illustrating the construction of a printing matrix as an extension of printing trays and printing function stages, according to embodiments of the present invention.

FIGS. 5a-5c are respective front side and plan views of a two table-two printing head matrix according to embodiments of the present invention.

DESCRIPTION OF THE PREFERRED EMBODIMENTS

Figures 2, 600:
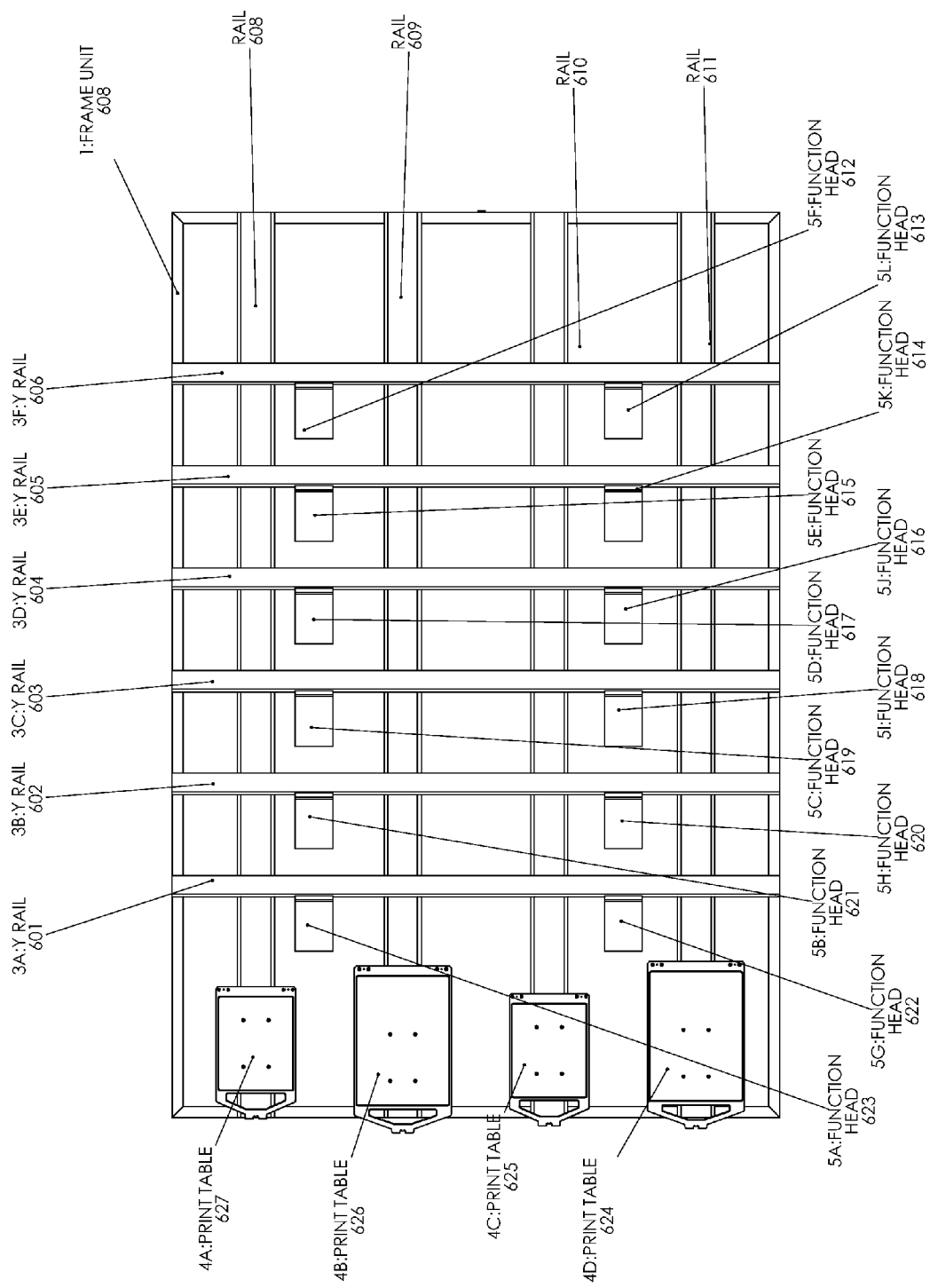
FIG. 2 is a simplified diagram illustrating embodiments of a two dimensional matrix.

The present embodiments provide a matrix textile or garment printing machine which may combine a plurality of printing trays in parallel and a plurality of stages in series and in parallel to be useful for varying printing operations.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIGS. 1a-1e which are simplified schematic diagrams illustrating the construction of a printing matrix as an extension of printing trays and printing function stages, according to embodiments of the present invention. According to embodiments of the present invention, there is provided a first rail for bearing a printing functional unit and a second rail for bearing a printing tray for holding an item to be printed, the tray being mobile along the rail to bring the item in proximity with the functional unit. The first rail is optionally positioned at a lower level then the second rail. By a functional unit is meant a print head or a wetting unit or a curing unit or a unit for providing any other function required in garment printing of any kind. More generally the functional unit is a unit capable of providing printing or other operations related to printing. Operations include pre-printing operations, post-printing operations as well as the printing operations themselves. A pre printing function can be, for example, wetting the garment before performing digital printing. A post printing function can be, for example, a curing function. A print tray may travel along the second rail to meet different functional units for different stages of a printing operation, and likewise the printing functional unit can move along the first rail to provide the same operations to different print trays. The travel of the trays and the travel of the functional units is optionally controlled by a computer so that print tray and functional unit meet as intended and any programmed printing operation is carried out. The trays may have different sizes.

FIG. 1a is a simplified diagram illustrating a module for a matrix according to one embodiment of the present invention. Matrix module 100 comprises first rail 101 for bearing a functional unit (not shown) and second rail 102 for bearing a tray (not shown). First rail 101 is orientated in the direction pointed by arrow 103 for allowing movement of the functional unit. Second rail 102 is orientated in the direction pointed by arrow 104 for allowing movement of the tray. The first rail may be placed substantially perpendicularly to the second rail. The functional unit may comprise an array of inkjet nozzles for performing digital printing, wherein each inkjet nozzle may be a drop-on-demand piezoelectric inkjet nozzle or a continuous piezoelectric inkjet nozzle. The functional unit may be for providing other operations related to printing, or for the printing itself. Thus functional units may be for preprinting or post printing, as discussed above. The functional units may be an array of sprayers, a curing unit for curing ink, an ironing unit for ironing the item to be printed, and a heat press. The curing unit can be an infrared curing unit, a hot air blowing curing unit or a microwave curing unit. The functional unit may be a printing unit, in which case it may be a stencil printing unit or a digital printing head, for example having an array of valve jet nozzles for performing digital printing.

FIG. 1b is a simplified diagram illustrating two of the modules 100 fixed side by side to form printing matrix 200. The matrix 200 comprises two rails 202 and 203 for bearing parallel trays (not shown) and one rail 201 for bearing a printing functional unit (not shown). Printing module 100 is illustrated in greater detail in FIG. 3. The two-module printing matrix 200 is illustrated in greater detail in FIG. 4. First rail 201 is orientated in the direction indicated by arrow 104 for allowing movement of the functional unit. Rails 202 and 203 are orientated in the direction indicated by arrow number 205 for allowing movement of the tray.

FIG. 1c is a simplified diagram illustrating a four module matrix 300 having two rails for bearing trays and two rails for bearing functional units. Printing matrix 300 is illustrated in greater detail in FIGS. 5A, 5B and 5C, which are discussed below.

It should be noted that two rails for bearing trays and two rails for bearing functional units are shown for the purpose of illustration only and without wishing to be limited. In principle the matrix can always be built to any suitable size. For example and without wishing to be limited, adding a rail having an ironing unit provides the ability to perform an ironing stage before or after existing printing stages. Matrix for printing 300 comprises a rail 301 for bearing a printing functional unit (not shown), a further rail 306 also for bearing a printing functional unit (not shown) and two rails 307 and 308 for bearing printing trays (not shown).

FIG. 1d is a simplified diagram illustrating another matrix for printing 400. Matrix for printing 400 comprises a rail 401 for bearing a printing functional unit (not shown) and four rails 403 and 404, 405 and 406 for bearing printing trays (not shown). It should be noted that one rail for bearing a functional unit is shown for the purpose of illustration only and without wishing to be limited and a matrix can be build with a plurality of rails for bearing functional units to more printing stages. The matrix can be built from any number of stages for bearing functional units to provide more garments or textile items to be printed asynchronously and to provide additional series of printing functions.

FIG. 1e is a simplified diagram illustrating a matrix for printing 500. Matrix for printing 500 comprises rails 501 and 502 for bearing printing functional units (not shown) and rails 506, 503, 508 and 513 for bearing printing trays (not shown).

Reference is now made to FIG. 2, which is a simplified diagram illustrating an embodiment of a matrix 600 comprising a plurality of printing trays in parallel and a plurality of printing stages.

Matrix 600 features rail 601 for bearing functional unit 623 and functional unit 622, rail 602 for bearing functional unit 621 and functional unit 620, rail 603 for bearing functional unit 619 and functional unit 618, rail 604 for bearing functional unit 617 and functional unit 616, rail 605 for bearing functional unit 615 and functional unit 614 and rail 606 for bearing functional unit 612 and functional unit 613. Matrix 600 also features rail 608 for bearing printing table (tray) 627, rail 609 for bearing printing table (tray) 626, rail 610 for bearing printing table (tray) 625 and rail 611 for bearing printing table (tray) 624.

In the exemplary diagram the rails that carry the functional units widthwise across the matrix are referred to as transverse rails, and those that carry the trays along the sequence of functional units which make up the length of the matrix are referred to as longitudinal rails. Matrix 600 features a modular frame unit for holding the modules together.

The modular matrix printer is programmable so that operations can be varied. Furthermore the two different paths down the matrix may or may not carry out the same operation, depending on their programming.

The two or more rails in parallel may at times perform the same process. The actual printing time for an individual item is not shortened by having parallel rails for the same process. However a single digital printing head can get on with printing an item on one rail while an item on the other rail is being handled by pre printing or post printing processes, or is being set up on a tray. Thus the overall time for the total number of garments which are printed in parallel is shortened, and/or the utilization of the functional units is increased.

The different rails may alternatively be engaged on different printing processes at the same time.

Figure 3:
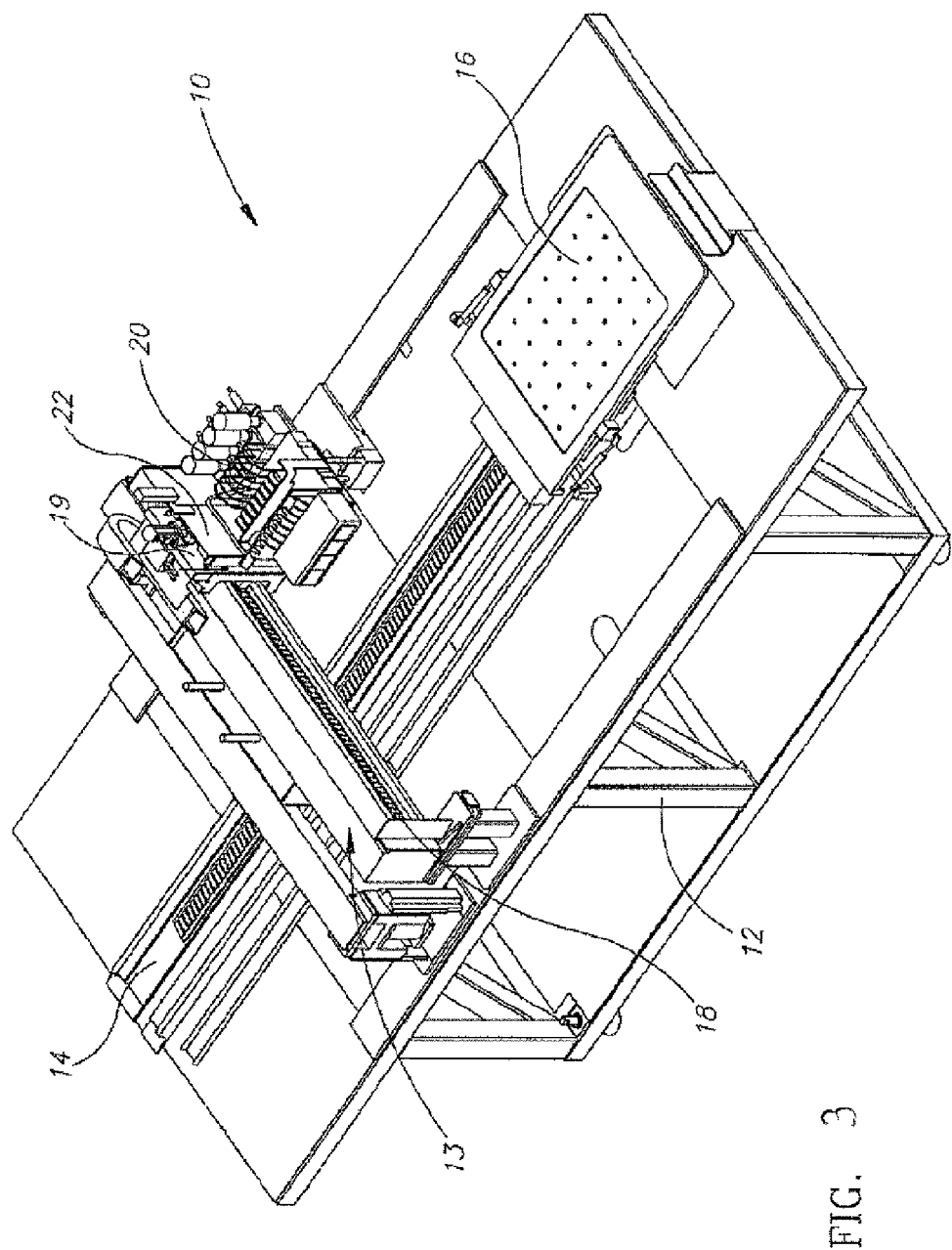
FIG. 3 is a diagram illustrating a two-table printing module, of which the matrix is an extension.

FIG. 3 is a schematic diagram illustrating an embodiment of a printing module comprising one table and one functional unit. The module may serve as a building block for the matrix. Printing module 10 comprises a rigid frame 12 in which a linear motion X axis rail 14 is installed. According to one embodiment, X-axis rail 14 is a linear motor driven stage, and may be a conventional linear stage. Alternatively, X-axis rail 14 may be any other type of linear rail, such as a belt-driven rail, or ball screw driven rail. A printing table assembly 16 is connected to X axis rail 14. Substantially perpendicular to the X axis direction, a linear motion Y axis rail 18 is installed above printing table assembly 16, for example on a bridge 13. Functional unit 20 is mounted to Y axis rail 18 by mounting 22. The functional unit 20 may be a printing head, and may comprise an array of inkjet nozzles for performing digital printing, wherein each inkjet nozzle may be a drop-on-demand piezoelectric inkjet nozzle or a continuous piezoelectric inkjet nozzle. The functional unit may alternatively be for preprinting or post printing or other printing related activities. The rails in the X and Y axes can be provided using known-in-the-art products, for example, including linear rails marketed by THK Co., Ltd., Tokyo, Japan, a linear encoder such as that sold by RSF Elektronik Ges.m.b.H., Tarsdorf, Austria, and a moving plate supported on the rails.

According to a preferred embodiment of the invention, the X-axis rail 14 and the Y-axis rail 18 are linear motor driven rails. A printing table assembly 16 may be mobile along X axis rail 14 to bring garments or textile cloth or the like (not shown) in proximity with the functional unit. Printing module 10 is configured to be placed or fixed within a frame alongside other modules, by juxtaposing the rails to corresponding rails on other modules, to provide continuity of travel between the modules.

It is noted that during the printing process the functional unit generally scans over the item to be printed. However in one variation the functional unit is stationary over the item to be printed and the tray scans under the functional unit.

Figure 4A:
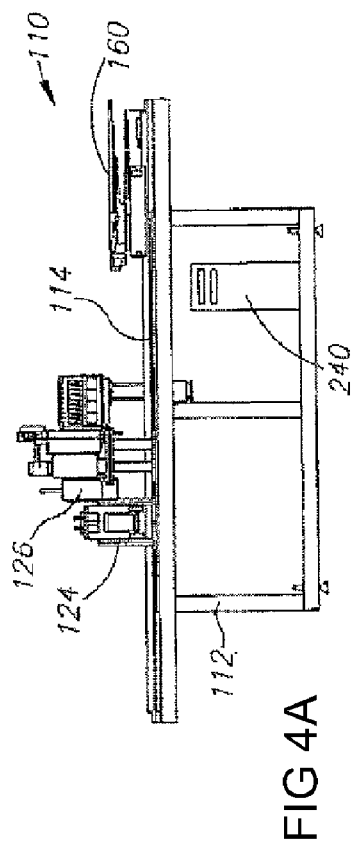
FIGS. 4a-4c are respective side, front and top views of a two table one printing head printing module, of which the matrix is an extension.
Figure 4C:
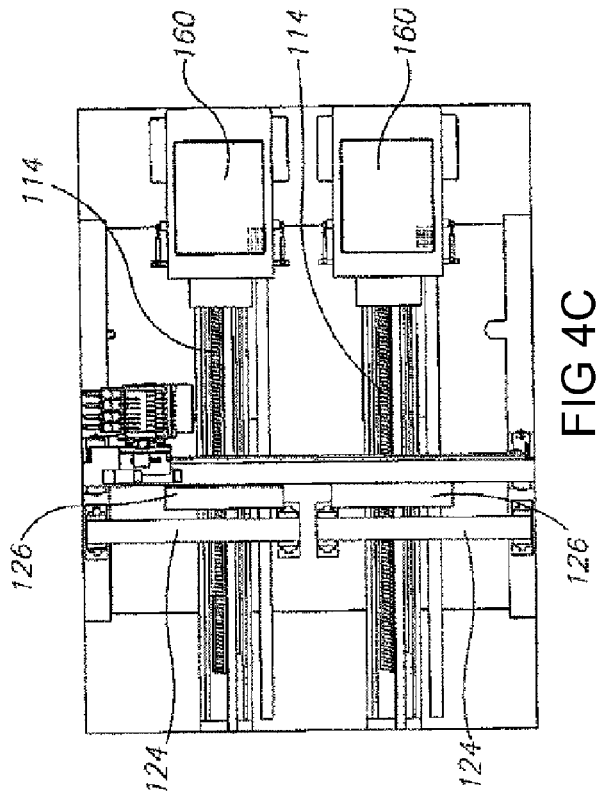
Figure 4B:
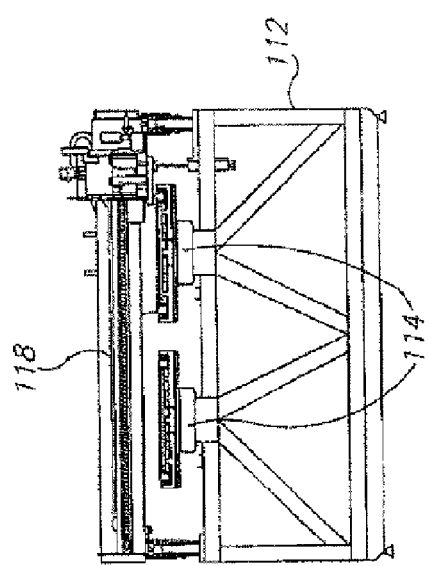

Referring now to FIGS. 4a, 4b and 4c, respective side, front and top views of a two module matrix 110 according to an embodiment of the invention, and corresponding to FIG. 1b, are presented. The matrix may be formed by placing two of the modules of FIG. 3 side by side and fixing within a frame. In the matrix of FIG. 4 two independent linear X axis rails 114 are installed side by side. A single Y axis rail 118 is substantially the same as Y axis rail 8 in FIG. 3 and is mounted on bridge 124. Matrix 110 may accommodate two printing table assemblies 160, and a functional unit 126 such as a printing head. The X axis rails may operate independently from one another, either on the same process or on different processes. The rather time consuming process of loading a garment on the printing tray, which may require careful folding, can be carried out on one printing table assembly at the same time that printing is being carried out on the second printing table assembly. As a result, the array operates substantially continuously, dramatically improving throughput of the machine. Each table can be accessed from the same edge, thereby permitting a single worker to operate two printing assemblies. A main computer may control both X axis rails for independent operation.

Reference is now made to FIGS. 5A, 5B and 5C which are schematic front, side and plan views respectively of a matrix printing machine according to an embodiment of the present invention and corresponding to FIG. 1C above. In textile printing machine 500 of FIGS. 5A to 5C are two X axis rails 502 and 504, each with printing trays 506 and 508 respectively.

At right angles to the two X axis rails are two Y axis rails 510 and 512. The two Y-axis rails each have respective functional units 514 and 516, typically print heads or curing units or the like. Each functional unit can operate on either of the print trays 506 and 508 as required.

Figure 6:
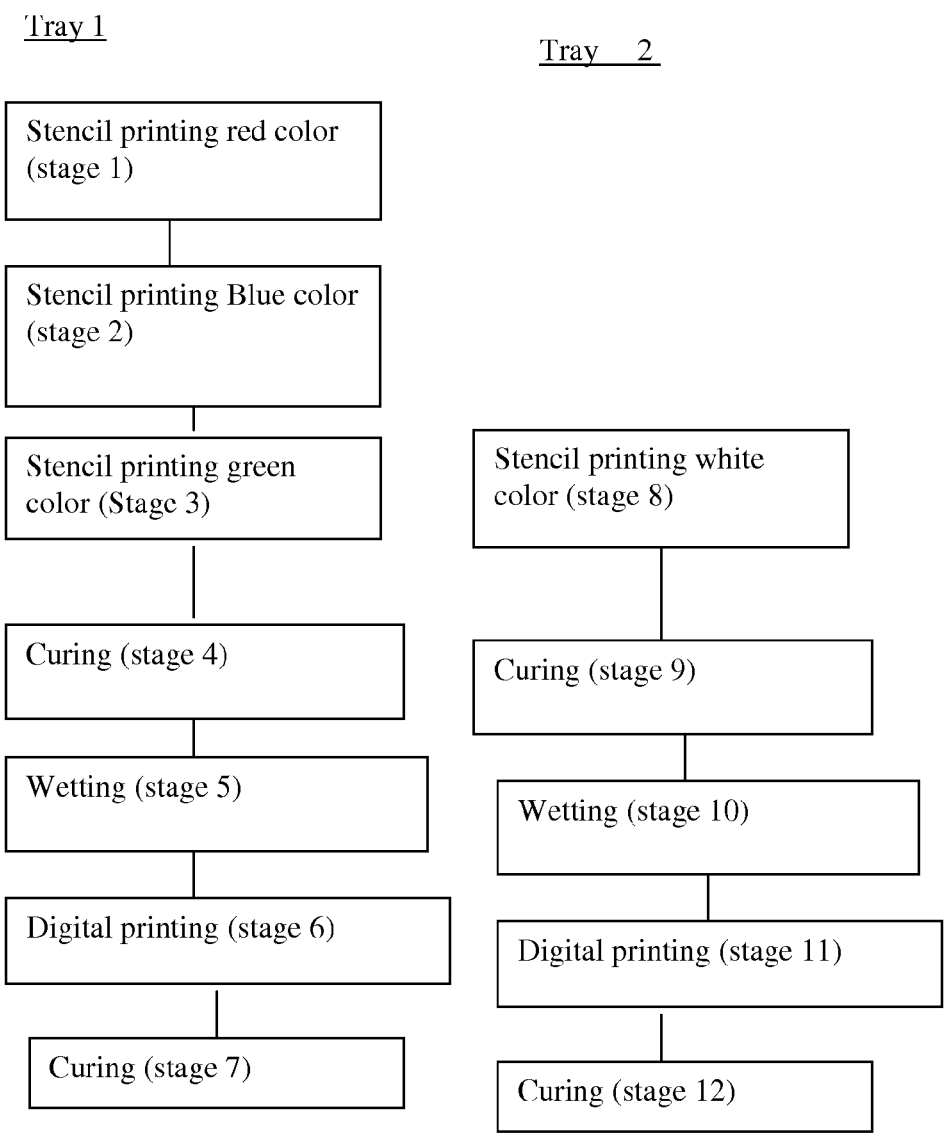
FIG. 6 is a diagram describing an exemplary printing scenario, using an embodiment of a two dimensional matrix.

FIG. 6 is a simplified diagram describing an exemplary printing scenario, using an embodiment of a two dimensional matrix. The figure illustrates a scenario in which two trays are being used for performing asynchronous printing processes on two textile items or garments. The exemplary diagram shows two processes each using a different number of stages. Each process is of different length and takes a different amount of time. The two processes take place side by side, but may nevertheless share some of the functional units within the matrix. First of all, each garment is placed on a tray. Stages 1-7 describe a printing sequence carried out on an item (a garment or a textile) placed on tray 1. In stage 1, tray 1 is located below a screen printer, which prints a red color on the item to be printed. When stage 1 is completed, tray 1 moves to the next functional unit in line, which is another screen printer. In stage 2, tray 1 is located below the second screen printer, which adds a blue color on the item to be printed. When stage 2 is completed, the tray moves to the next functional unit in line, which is a third screen printer. In stage 3, tray 1 is located below the third screen printer, which adds a green color on the item to be printed. When stage 3 is completed, tray 1 moves to the next functional unit in line, which is a wetting unit. In stage 4, tray 1 is located below the wetting unit, which wets the item to prepare the item for digital printing. When stage 4 is completed, tray 1 moves to the next functional unit in line, which is a digital printer. In stage 5, tray 1 is located below the digital printer, which prints one or more digital images on the garment etc. When stage 5 is completed, tray 1 moves to the next functional unit in line, which is a curing unit. In stage 6, tray 1 is located below the curing unit which cures the printed item.

Stages 8-12 are performed using tray 2 which holds a second garment etc. to be printed. Stage 8 is performed asynchronously to stages 1-3. In stage 8 tray 2 is located below a further screen printing unit of a second series, which is now located over the horizontal rail carrying tray 2. The further screen printer prints the item which is located on tray 2 in white. In stage 9, a curing unit may be used for curing the item on tray 2. When stage 9 is completed, the tray moves to the next functional unit in line, which is a wetting unit. In stage 10, tray 2 is positioned below a wetting unit for wetting the item before performing digital printing. A single wetting unit may be shared by both processes, and use of the same wetting unit by each tray can be achieved by moving the wetting unit along its corresponding Y-axis rail.

When stage 10 is completed, the tray moves to the next functional unit in line, which is a digital printing unit for digital printing in stage 11. The digital printing unit used for stage 11 may be the same as that used for stage 5 and the first tray.

After digital printing the tray moves to a curing stage 12, and again the curing unit used may be shared with the first tray. In general, using a matrix of modules allows flexible printing processes which may use different numbers of stages, and which are able to share functional units. Variation is possible both by programming and by adding additional rails.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A textile printing machine comprising a plurality of printing modules arranged in an m×n matrix, the matrix having a longitudinal direction and a transverse direction, the matrix having m first rails in said transverse direction for supporting printing functional units, and n second rails in said longitudinal direction for supporting printing trays that carry textiles to be printed, each module defining a meeting point between one of said first rails and one of said second rails for a textile printing related operation to take place, and wherein both m and n are integers of at least two, the matrix thereby providing linear printing sequences.

2. The textile printing machine of claim 1, wherein said matrix is held together by a frame.

3. The textile printing machine of claim 1, wherein said printing related operations comprise at least two of digital printing, screen printing, pre-printing and post-printing operations.

4. The textile printing machine of claim 1, having a programmable controller, wherein each of said n transverse rails carries textiles for undergoing parallel printing sequences, and wherein said programmable controller comprises a process timer for ensuring that textiles on different ones of said transverse rails arrive at given stages of said parallel sequences at different times.

5. The textile printing machine of claim 1, having a programmable controller, wherein each of said n transverse rails carries textiles for undergoing different printing sequences, and wherein said programmable controller comprises a process timer for ensuring that textiles on different ones of said transverse rails require the same functional units at different times.

6. The textile printing machine of claim 1, wherein at least one of m and n is at least three, or at least four or at least five or at least six.

7. The textile printing machine of claim 1, wherein said textile printing trays are respectively independently controllable.

8. The textile printing machine of claim 1, wherein one of said printing functional units is digital printing head, wherein said inkjet nozzles further comprise drop-on-demand piezoelectric inkjet nozzles or continuous piezoelectric inkjet nozzles.

9. The textile printing machine of claim 1, wherein one of said printing functional units comprises one member of the group consisting of an array of sprayers, a curing unit for curing ink on said item to be printed, an infrared curing unit, a hot air blowing curing unit, a microwave curing unit, an ironing unit for ironing said item to be printed, a stencil printing unit, an array of valve jet nozzles for performing digital printing, and a heat press.

10. A method for building a matrix for textile printing; comprising:
   a. providing m first rails for bearing respective printing functional units and n second rails for bearing respective printing trays for holding a textile to be printed; and
   b. forming an m×n matrix comprising a plurality of said printing functional unit, said forming comprising placing said m first rails substantially perpendicularly to each of said second rails to form an m×n printing matrix therefrom, both m and n being integers greater than 1.

* * * * *